United States Patent
Macho

(10) Patent No.: US 9,646,610 B2
(45) Date of Patent: May 9, 2017

(54) METHOD AND APPARATUS FOR ACTIVATING A PARTICULAR WIRELESS COMMUNICATION DEVICE TO ACCEPT SPEECH AND/OR VOICE COMMANDS USING IDENTIFICATION DATA CONSISTING OF SPEECH, VOICE, IMAGE RECOGNITION

(71) Applicant: MOTOROLA SOLUTIONS, INC., Schaumburg, IL (US)

(72) Inventor: Dusan Macho, Arlington Heights, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 1080 days.

(21) Appl. No.: 13/663,850

(22) Filed: Oct. 30, 2012

(65) Prior Publication Data

US 2014/0122087 A1 May 1, 2014

(51) Int. Cl.
*G10L 21/00* (2013.01)
*G06F 1/00* (2006.01)
(Continued)

(52) U.S. Cl.
CPC ............ *G10L 15/22* (2013.01); *G06F 1/3203* (2013.01); *G10L 17/22* (2013.01); *G10L 13/033* (2013.01);
(Continued)

(58) Field of Classification Search
CPC . G03G 15/5016; G06F 1/3215; G06F 1/3203; G10L 15/063; G10L 15/265; G10L 13/033
(Continued)

(56) References Cited

U.S. PATENT DOCUMENTS 5,369,728 A 11/1994 Kasaka et al.
5,425,129 A 6/1995 Garman et al.
(Continued)

FOREIGN PATENT DOCUMENTS

WO 0205443 A2 1/2002
WO 03038659 A1 5/2003
(Continued)

OTHER PUBLICATIONS

Xbox, Kinect Voice Commands and Speech Regognition; Sep. 8, 2011; xbox.com; 3 Pages.
(Continued)

*Primary Examiner* — Farzad Kazeminezhad
(74) *Attorney, Agent, or Firm* — Barbara R. Doutre; Kenneth A. Haas

(57) ABSTRACT

An apparatus, method, and computer program for initiating a word spotting algorithm (220) on one or more wireless communication devices in a first power mode to detect a keyword data sequence (224) embedded within a sampled audio signal (222). In response to detecting the keyword data sequence (226), the word spotting algorithm is terminated and a plurality of identification algorithms (230) consisting of speech, voice, image recognition and a predetermined isolation time criterion are initiated on the one or more wireless communication devices operating in a second power mode to detect the presence of identification data (240). If identification data is detected on a particular wireless communication device it is activated to accept speech and/or voice commands (242). On the other hand, if identification data is not detected, the plurality of identification algorithms are terminated, and the word spotting algorithm is reinitiated on the one or more wireless communication devices that are then operating in the first power mode (244).

20 Claims, 8 Drawing Sheets

(51) Int. Cl.
*G10L 15/22* (2006.01)
*G06F 1/32* (2006.01)
*G10L 17/22* (2013.01)
*G10L 13/033* (2013.01)
*G10L 15/26* (2006.01)
*G10L 15/08* (2006.01)

(52) U.S. Cl.
CPC ...... *G10L 15/265* (2013.01); *G10L 2015/088* (2013.01)

(58) Field of Classification Search
USPC .................................. 704/275, 278; 713/323
See application file for complete search history.

(56) References Cited

U.S. PATENT DOCUMENTS

| | | | |
|---|---|---|---|
| 5,752,231 A | 5/1998 | Gammel | |
| 6,009,383 A | 12/1999 | Mony | |
| 6,253,184 B1* | 6/2001 | Ruppert | G03G 15/5016 704/272 |
| 7,035,091 B2 | 4/2006 | Le et al. | |
| 7,146,139 B2 | 12/2006 | Nevermann | |
| 7,221,290 B2 | 5/2007 | Burgemeister | |
| 7,499,722 B2 | 3/2009 | McDowell et al. | |
| 7,664,649 B2 | 2/2010 | Jost et al. | |
| 7,783,316 B1* | 8/2010 | Mitchell | H03M 13/353 348/725 |
| 8,023,984 B2 | 9/2011 | Jin et al. | |
| 8,103,510 B2 | 1/2012 | Sato | |
| 8,811,918 B2 | 8/2014 | Rath et al. | |
| 2006/0149558 A1* | 7/2006 | Kahn | G10L 15/063 704/278 |
| 2007/0005370 A1 | 1/2007 | Elshout | |
| 2007/0177744 A1 | 8/2007 | Kirn | |
| 2008/0062045 A1 | 3/2008 | Dinallo et al. | |
| 2008/0242288 A1 | 10/2008 | Guyette | |
| 2009/0305742 A1 | 12/2009 | Caballero et al. | |
| 2009/0307511 A1* | 12/2009 | Fiennes | G06F 1/3215 713/323 |
| 2009/0313014 A1 | 12/2009 | Shin | |
| 2010/0114573 A1 | 5/2010 | Huang et al. | |
| 2011/0237289 A1 | 9/2011 | Fodor et al. | |
| 2012/0010890 A1 | 1/2012 | Koverzin | |
| 2012/0071195 A1 | 3/2012 | Chakraborty et al. | |
| 2012/0257657 A1 | 10/2012 | Subrahmanya et al. | |
| 2014/0257812 A1 | 9/2014 | Mozer | |

FOREIGN PATENT DOCUMENTS

| | | |
|---|---|---|
| WO | 2012033825 A1 | 3/2012 |
| WO | 2012066559 A1 | 5/2012 |
| WO | 2012122116 A1 | 9/2012 |
| WO | 2013011352 A1 | 1/2013 |
| WO | 2013048876 A1 | 4/2013 |

OTHER PUBLICATIONS

USA Office Action Dated Dec. 29, 2014 for Related U.S. Appl. No. 13/731,646.
PCT International Search Report Dated Dec. 3, 2013 for Counterpart Application PCT/US2013/065221.
PCT International Search Report Dated Feb. 11, 2014 for Related Counterpart Application PCT/US2013/071972.
USA Office Action Dated Oct. 8, 2014 for Related U.S. Appl. No. 13/731,646.
International Preliminary Report on Patentability for corresponding International Patent Application No. PCT/US2013/065221, mailed on May 5, 2015.

* cited by examiner

METHOD AND APPARATUS FOR ACTIVATING A PARTICULAR WIRELESS COMMUNICATION DEVICE TO ACCEPT SPEECH AND/OR VOICE COMMANDS USING IDENTIFICATION DATA CONSISTING OF SPEECH, VOICE, IMAGE RECOGNITION

FIELD OF THE DISCLOSURE

The present disclosure relates generally to speech recognition and more particularly to activating a wireless communication device by speech and/or voice.

BACKGROUND

Increasingly, speech recognition and voice recognition are becoming common features in wireless communication devices. Speech recognition generally refers to the translation of spoken words into audio signals for further processing (e.g., translating into text, activating applications and/or features within the activated applications), and includes speaker independent systems (i.e., systems not requiring specific user speech training) and speaker dependent systems. Voice recognition refers to determining the identity of the particular mobile user who is speaking rather than determining what the speaker is saying. Recognition of the speaker can be utilized to authenticate or verify the identity of a speaker as part of a security process in accessing applications on the wireless communication device.

Typically, a mobile user initiates speech and/or voice recognition by pushing either a mechanical on or activation button or sliding or pressing a software emulated on or activation button on the face of a touch screen display of a wireless communication device. Thereafter, the mobile user utters a specific word or series of words while in acoustic range of the wireless communication device. In certain scenarios several devices such as a smart phone, traditional cellular phone, tablet and the like may be closely co-located such as in individual collocated charging units and/or a multi-device charging rack. In such a scenario, the mobile user is burdened by locating the wireless communication device as well as by activating the on or activation button as described above. Leaving each device in an "open microphone" configuration is not currently a solution due to the high false alarm rate (i.e., rate of unwilling activations). In other words, in such a scenario as that described above, the wireless communication device would experience a significant reduction in battery life. Such a scenario also would impede the charging of the device's battery, as well expose the device to potential security threats.

Another possible similar, but more serious, scenario could involve a group of first responders (e.g., police, firefighters, emergency medical technicians and the like) proximately located each having their own radio. Such a scenario may be the result of the recently mandated First Responders Network Authority (FirstNet), will be responsible for establishing a nationwide public safety broadband network (FirstNet Nationwide Network (FNN)). FNN is based on a single, national network architecture utilizing the 700 MHz D block spectrum (Band 14) along with other terrestrial mobile long term evolved (LTE)/LTE-advance (LTE-A) networks. FirstNet requires substantial industry collaboration to specify user requirements, interoperability and technology standards. FirstNet also will consult with Federal, State, tribal, and local public safety entities as part of its efforts. Among the responsibility of FirstNet is to enable police, firefighters, emergency medical technicians and other first responders to effectively communicate with one another during emergencies and to use new technology to improve response time, keep communities safe and save lives.

Accordingly, there is a need for a method and apparatus for activating a wireless communication device to accept subsequent speech or voice commands. There also is a similar need for a method and apparatus for activating a particular wireless communication device among a plurality of wireless communication devices to accept subsequent speech or voice commands.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
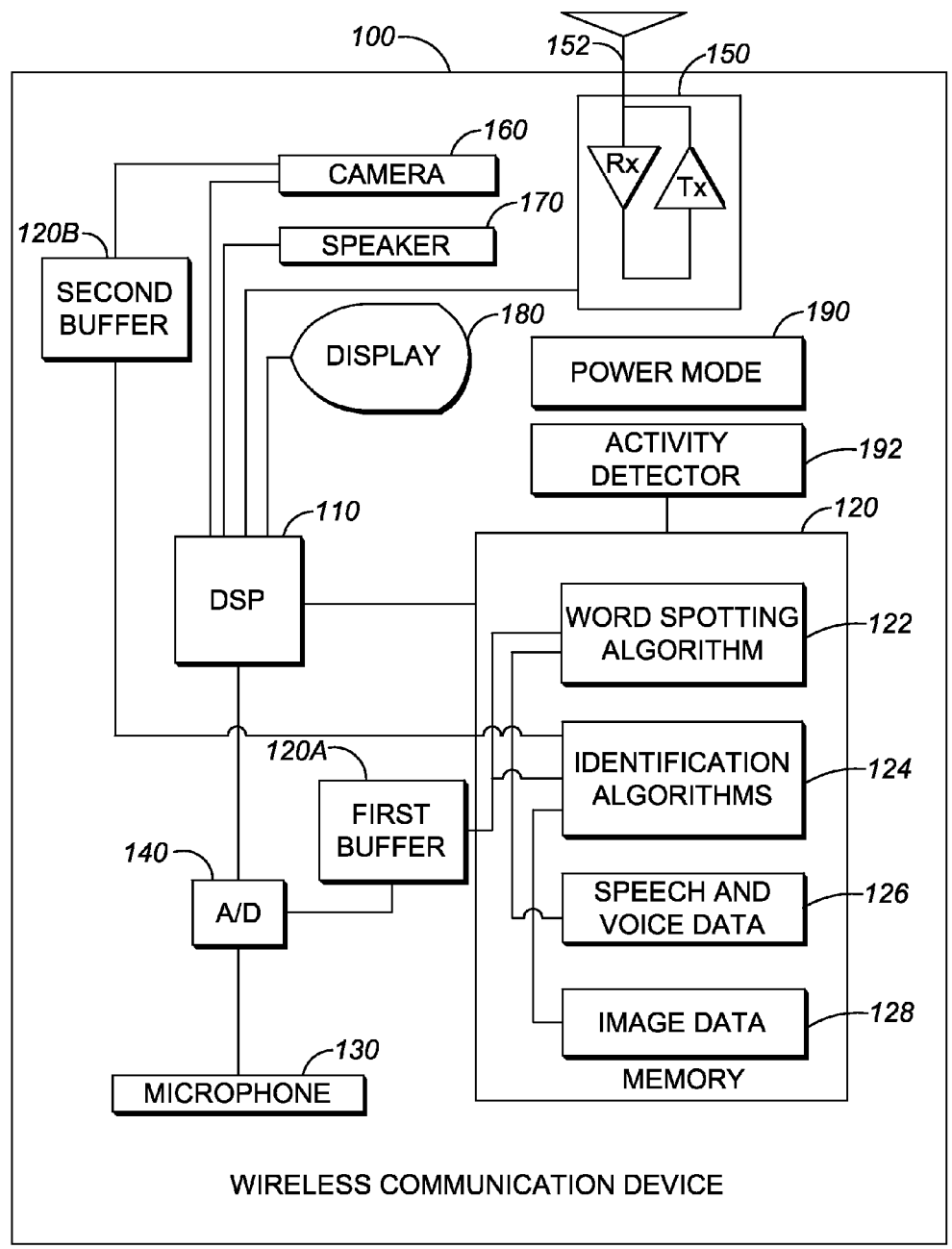
FIG. 1 is a simplified block diagram of a non-limiting example of a wireless communication device 100 suitable for use in practicing some embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments described herein so as not to obscure the disclosure with details that will be readily apparent to those of ordinary skill in the art having the benefit of the description herein.

DETAILED DESCRIPTION

Examples of various embodiments provide apparatuses, methods, and computer-readable media with programs that utilize a word spotting algorithm on wireless communication devices in a first power mode to detect a keyword data sequence embedded within a sampled audio signal. In response to detecting the keyword data sequence, the word spotting algorithm may be terminated and one or more of a plurality of identification algorithms are initiated on the wireless communication device(s) operating in a second power mode to detect the presence of identification data. If identification data is detected on a particular wireless communication device it is activated to accept speech and/or voice commands. On the other hand, if identification data is not detected, the one or more identification algorithms are terminated, and the word spotting algorithm is reinitiated on the wireless communication device(s), which are then operating in the first power mode.

As used throughout this disclosure speech recognition refers to the translation of spoken words into audio signals for further processing to identify words (e.g., translating into text, activating applications and/or features within the activated applications). Speech recognition algorithms may include speaker-independent systems (i.e., systems not requiring specific user speech training) and speaker-dependent systems. Voice recognition refers to determining the identity of the particular mobile user who is speaking, rather than determining what he or she is saying. Recognition of the speaker can be utilized to authenticate or verify the identity of a speaker as part of a security process in accessing applications on the wireless communication device.

Non-limiting examples of the one or more identification algorithms includes: (i) a speech recognition algorithm; (ii) voice recognition algorithm; (iii) an isolation algorithm; and (iv) an image recognition algorithm. A more detailed description of each of the above four identification algorithms is provided below.

In one embodiment, if one or more of the plurality of identification algorithms detects identification data, the wireless communication device is activated to accept subsequent speech or voice commands. For example, one embodiment may include keyword identification followed by speech recognition of the correct device ID (i.e., the speech recognition algorithm identifies a correct sequence of digits following the keyword). A further embodiment may include keyword identification followed by voice recognition (i.e., voice print data derived from the sampled audio signal matches a predetermined voiceprint data). A further embodiment may include keyword identification, speech recognition of the correct device, combined with voice recognition. In yet a further embodiment, keyword identification may be combined with is visual identification, which may include processing images from a camera associated with the communication device to determine if they match predetermined images. A further embodiment may include keyword identification followed by either speech recognition or voice recognition, or both, followed by visual identification. A further identification algorithm referred to herein as degree of isolation, may be used to ensure that the keyword, or the keyword in combination with subsequent digits, or the keyword in combination with subsequent identification utterances, are isolated in a stream of utterances, indicating that the speaker is awaiting a response from the mobile communications device. The degree of isolation algorithm may be used individually or combined with any of the above embodiments.

In still further alternative embodiments, multiple identification algorithms may be used to process available data (e.g., sampled audio data, image data) until a match is found or until all the algorithms have been used with no match being found. Alternatively, a sequence of algorithms may be initiated, with the sequence being determined by the success or failure of individual algorithms. For example, if a speaker's identification is found unreliable by either the voice or image recognition algorithm, but the speech recognition algorithm reliably indicates the correct device (e.g., embedded numeric or alphanumeric identity code matches a predetermined numeric or an alphanumeric identity code), then the wireless communication device can still be activated for voice communication.

In another alternative exemplary embodiment, if fewer than two of the plurality of identification algorithms (which may include any three or more of the described identification algorithms) fails to detect identification data, the wireless communication device is not activated to accept speech or voice commands. For example, in this embodiment at least two of the plurality of identification algorithms must detect the identification information.

FIG. 1 is a simplified block diagram of a non-limiting example of a wireless communication device 100 suitable for use in practicing various embodiments described herein. Wireless communication device 100 includes one or more processing devices, such as at least one digital signal processor (DSP) 110. Also included is at least one computer-readable memory 120 tangibly embodying a program of instructions executable by the wireless communication device 100. For example, computer-readable memory 120 may store a plurality of computer programs such as a word spotting algorithm 122, one or more identification algorithms 124, and various stored data such as speech and voice data 126 and image data 128, suitable for carrying out the various embodiments. Also shown in FIG. 1, is a first data buffer 120A and a second buffer 120B. First data buffer 120A is suitable for storing data such as digital sampled audio signals obtained from an analog to digital convertor (ADC) 140 and microphone 130 such as an electret condenser microphone adapted to continuously capture acoustic sound proximately within ranges of the device as known in the art.

Wireless communication device 100 may also include, for example, at least one transceiver module 150 adapted for transmission and reception of wireless signals by way of one or more antennas, such as antenna 152. In one non-limiting embodiment, transceiver module 150 transmits and receives signals over a land mobile radio system (LMRS), public land mobile radio or private land mobile radio system. In another non-limiting embodiment, transceiver module 150 transmits and receives signals over a first responders' network authority (FirstNet) nationwide network (FNN) in the 700 MHz D block spectrum (Band 14). In yet another non-limiting embodiment, transceiver module 150 (in conjunction with one or more additional transceiver modules (not shown)) is adapted to transmit and receive wireless signals over FNN and an enhanced data rates for Global System for Mobile Communication (GSM) Evolution (EDGE) Radio Access Network (GERAN), a Universal Terrestrial Radio Access Networks (UTRAN) and/or an Evolved Universal Terrestrial Radio Access (E-UTRAN) as defined by the long term evolution (LTE), LTE-advanced (LTE-A) and subsequently defined in future releases such as LTE-beyond (LTE-B).

Also, shown in FIG. 1 is a power mode function 190 adapted for reducing or increasing power consumption of a battery (not shown) in wireless communication device 100, such as entering a first power mode that is a low power mode and a second power mode that is a high power mode. The low-power mode may be an operational mode that consumes a small amount of power, and therefore enables the communications device to operate with an open microphone. That is, audio signals may be continually received, sampled, and processed by the keyword detection algorithm, or word spotting algorithm, without significantly impacting, or shortening, the operational battery life of the mobile communications device. The word spotting algorithm operates to identify the presence of a single keyword within an utterance. The keyword may be one or more syllables in one or more words, but because the word spotting algorithm is attempting only to identify the presence of the keyword, rather than to identify spoken words from a very large library (or, e.g., process image data), it consumes considerably less power than the identification algorithms. The second power mode of the mobile communications device consumes a higher amount of power than the first power mode. This is because the identification algorithms are relatively more sophisticated than the word spotting algorithm, and therefore require a higher amount of processor time, and require the execution of more computer instructions. Further, in some embodiments, the mobile communications device may need to activate additional hardware components such as a camera in order to obtained necessary data to perform the identification algorithms. Thus it should be understood that the first and second power modes may be explicitly set by the operation of the communications device, and by its processors, or they may be set or determined implicitly according to the level of processor activity within the communications device. Specifically in one embodiment, in a first power mode the communications device may be consuming a first amount of power by virtue of operating the ADC to sample the incoming audio signal and processing the sampled audio signal using the keyword detection algorithm. The communications device may switch to a second, higher, power mode simply by virtue of operating the ADC to sample the incoming audio signal and processing the sampled audio signal using one or more of the identification algorithms, which are relatively more complex than the word spotting algorithm. The second power mode may also consume a higher amount of power because keyword detection may trigger the acquisition of one or more images, which requires explicit activation of the camera (160). Additional power consumption differences may be associated with the first and second power modes. For example, in the first power mode the ADC may operate at a lower sample rate than normal operation, yet still sufficient for the word spotting algorithm to identify the keyword, while in the second power mode the ADC may operate at a higher rate to provide higher-quality sampled audio signals to the identification algorithms. In a further alternative embodiment, in the first power mode the ADC may operate intermittently where samples are not taken during small time intervals without affecting the accuracy of the word spotting algorithm. Still further, a speech activity detector (192) may be used to monitor the power level of the audio signal (either in analog or digital form) and responsively disable the word spotting algorithm when the power is below an activity threshold, indicating that no speech is present. The activity detector may take the form of a simple analog or digital low pass filter. The activity threshold may adapt according to a long-term average of the signal power, such that the activity threshold may change as the mobile communication devices moves between noisy and relatively quiet environments.

Wireless communication device 100 can be: a cellular phone, a personal digital assistant, a wireless modem (i.e., access point), a wireless communication device, a laptop computer, a netbook, a tablet computer or a wireless device configured to communicate with a land mobile radio system (LMRS), a public land mobile radio, private land mobile radio system, a first responders network authority (FirstNet) nationwide network (FNN), an enhanced data rates for Global System for Mobile Communication (GSM) Evolution (EDGE) Radio Access Network (GERAN), a Universal Terrestrial Radio Access Networks (UTRAN) and/or an Evolved Universal Terrestrial Radio Access (E-UTRAN) as defined by the long term evolution (LTE), LTE-advanced (LTE-A) and subsequently defined in future releases such as LTE-beyond (LTE-B).

Also, shown in FIG. 1 are optional output components such as a speaker 170 and display 180, such as an LED backlit LCD display or more basic LED display, or other display suitable for responding to a user's utterances as used in practicing some embodiments.

In one embodiment of an apparatus, the device includes at least one processor; and at least one tangible memory storing computer instructions that when executed, cause the apparatus to: initiate a word spotting algorithm on a wireless communications device in a first power mode to detect a keyword data sequence embedded within a sampled audio signal; and in response to detecting the keyword data sequence, terminating the word spotting algorithm and initiating one or more identification algorithms on the wireless communication device operating in a second power mode to detect the presence of identification data, wherein if the identification data is detected, the wireless communication device is activated, wherein if the identification data is not detected, the identification algorithm is terminated, and the word spotting algorithm is reinitiated on the wireless communication device operating in the first power mode.

Figure 2:
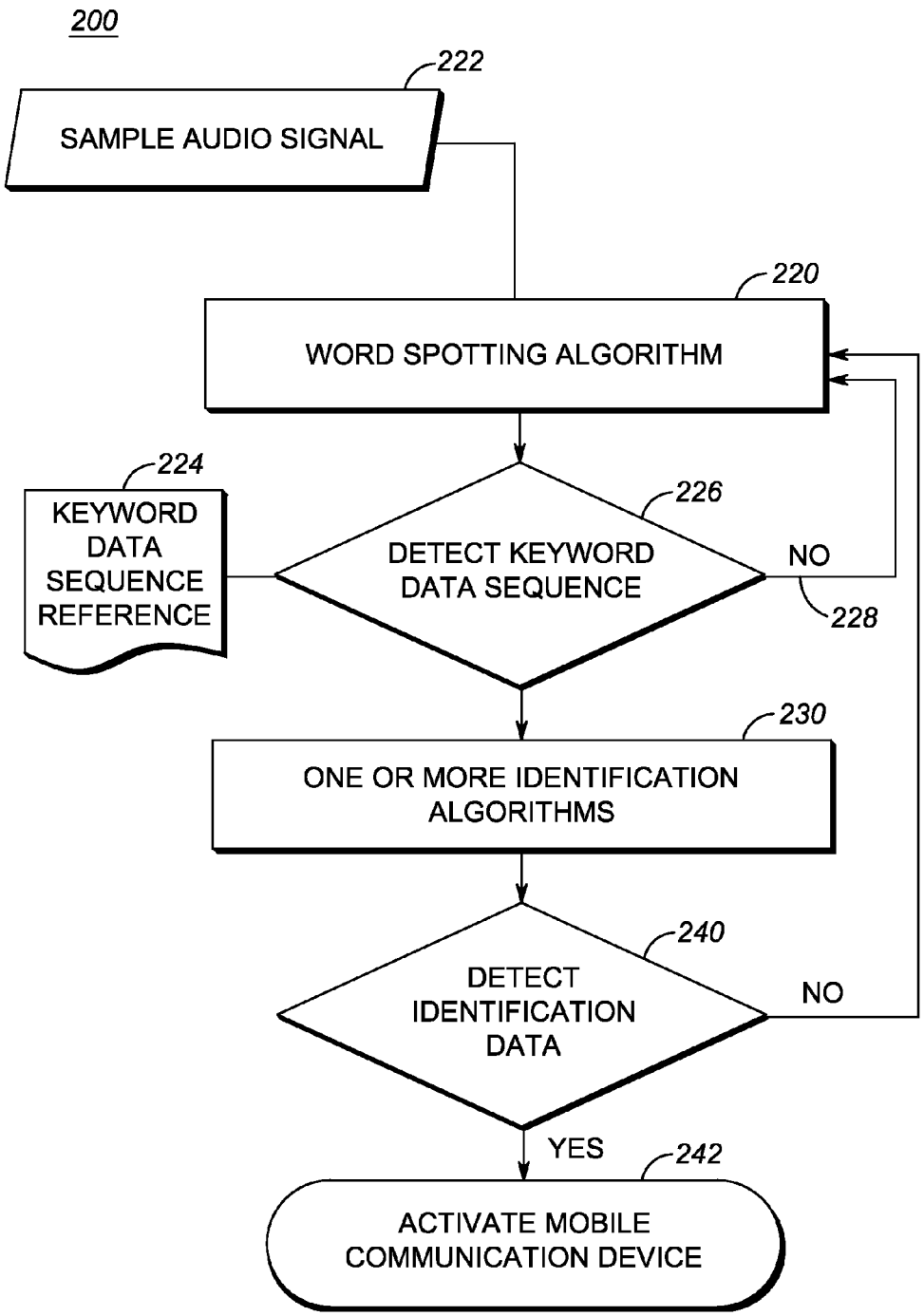
FIG. 2 is a logical flow diagram that illustrates the operation of a method, and a result of execution of computer program instructions embodied on a non-transitory computer readable memory that may be performed on a wireless communication device according to some embodiments described herein.

Referring now to FIG. 2, a logical flow diagram is shown that illustrates the operation of a method, and a result of execution of computer program instructions embodied on a non-transitory computer readable memory that activate a wireless communication device to accept subsequent speech or voice commands (200). Such a method or execution of computer program instructions initiates a word spotting algorithm (220) on the wireless communication device in a first power mode to detect a keyword data sequence embedded within a sampled audio signal (222). The word spotting algorithm may utilize a keyword data sequence reference signal (224). In response to detecting the keyword data sequence, the word spotting algorithm is terminated (228) and one or more identification algorithms (230) are initiated in a particular wireless communication device operating in a second power mode to detect the presence of identification data (240). If identification data is detected on a particular wireless communication device, it is activated to accept speech and/or voice commands (242). On the other hand, if identification data is not detected, the plurality of identification algorithms are terminated, and the word spotting algorithm is reinitiated on the wireless communication device that is then operating in the first power mode (244).

Figure 3:
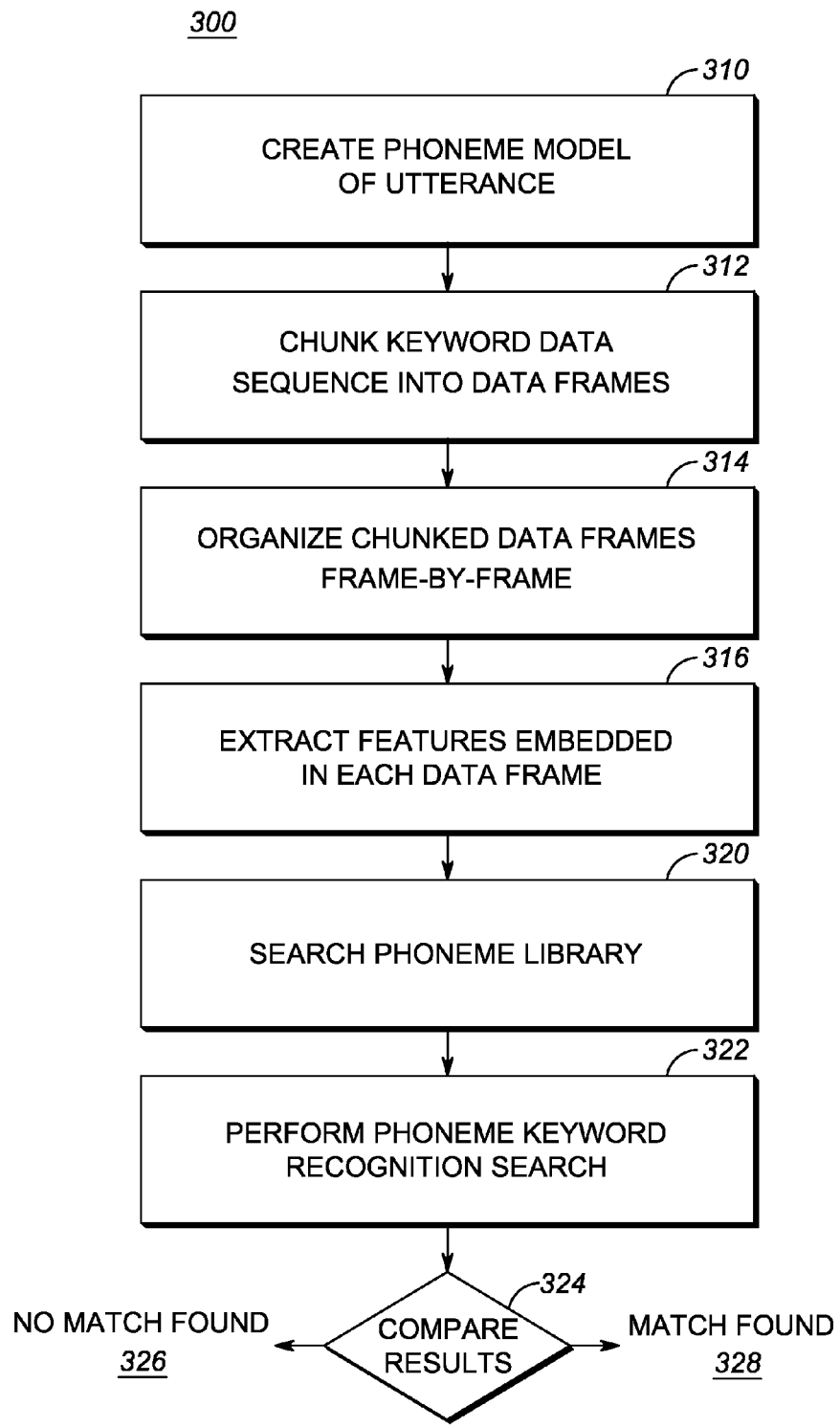
FIG. 3 is a logical flow diagram that illustrates and describes a word spotting algorithm in accordance with embodiments described herein.

Referring now to FIG. 3, a logical flow diagram is shown that illustrates and describes a word spotting algorithm (300). As shown in FIG. 3, initially the word spotting algorithm creates a Phoneme model of the spoken utterance containing the embedded keyword data sequence (310). In one embodiment, a hidden Markov model is employed as known in the art. Creating the Phoneme model may include chunking data received from an analog to digital convertor into data frames (312), and then organizing the chunked data frame-by-frame (314). The data may be chunked in such a way that data is repeated in more than one frame to provide for overlapping frames. Next, features embedded in each frame are extracted (316), possibly in the form of n-dimensional vectors, containing, e.g., cepstral coefficients. Then a search of a Phoneme library for the modeled utterance, which may contain the embedded keyword data sequence is performed (320). In one exemplary embodiment, the Phoneme library is located in memory on a wireless communication device. In an alternative embodiment, the Phoneme library is located on a remote network server. Finally, a Phoneme recognition search is performed (322) by comparing the sequence of recognized phonemes to the keyword data reference sequence, where the keyword data reference signal is a known, or predetermined, phoneme sequence representing the keyword. If no match is found (326), the word spotting algorithm terminates. On the other hand, if a match is found the word spotting algorithm is terminated and one or more identification algorithms are initiated on the wireless communication device operating in a second power mode to detect the presence of identification data (328). In a further embodiment, the word spotting algorithm may include chunking data received from an analog to digital convertor into data frames; extracting features embedded in each frame of chunked data for phoneme recognition; and, comparing recognized phonemes to a sequence of phonemes in a keyword data reference sequence.

Figure 4:
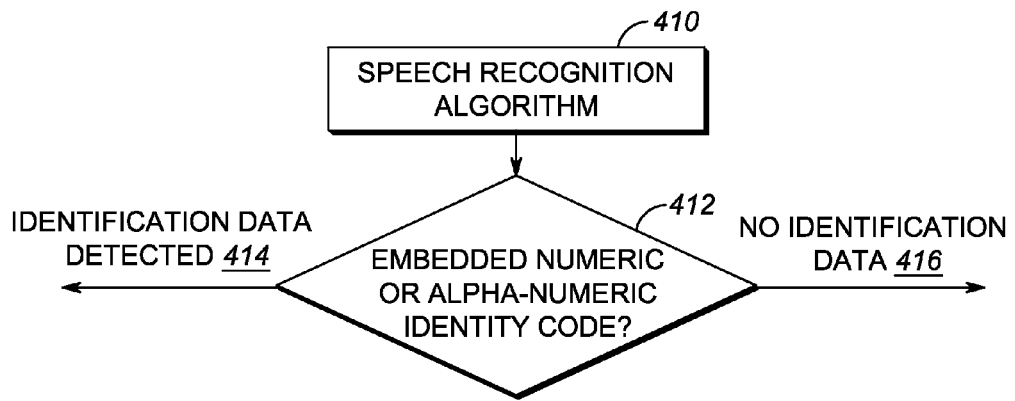
FIG. 4 is a logical flow diagram that illustrates and describes an embodiment of an identification algorithm.

Referring now to FIGS. 4-7, logical flow diagrams are shown that illustrate and describes a plurality of identification algorithms. As shown in FIG. 4 a speech recognition algorithm (410) is adapted for operating on a sampled audio signal to identify if an embedded numeric or alphanumeric identity code matches a predetermined numeric or alphanumeric identity code (412). In one embodiment, a digit recognizer as known in the art is employed to identify if the embedded numeric or alphanumeric identity code matches the predetermined numeric or alphanumeric identity code. A digit recognizer may operate in a manner similar to a word-spotting algorithm described above, with the exception that the digit recognizer is more complex in that it must identify a longer sequence of phonemes, and compare them to larger reference sequences. If this identification data is detected, the wireless communication device may be activated to accept further speech and/or voice commands (414). Alternatively, if this identification data is not detected (416), the identification algorithm is terminated, and the word spotting algorithm is reinitiated on the wireless communication device that is then operating in the first power mode. Alternatively, if this identification data is not detected, one or more additional identification algorithms may be performed.

Figure 5:
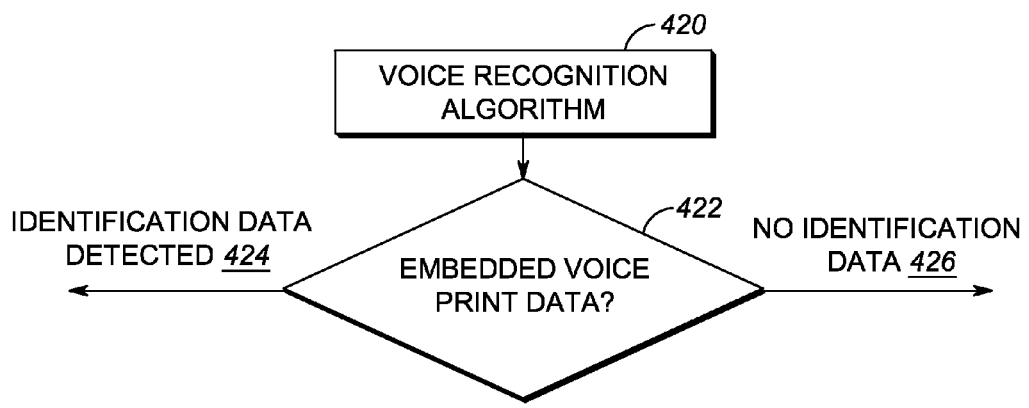
FIG. 5 is a logical flow diagram that illustrates and describes an embodiment of an identification algorithm.

In a further embodiment, a voice recognition algorithm (420) is performed on the sampled audio signal as shown in FIG. 5. The voice recognition algorithm, also referred to herein as speaker verification or recognition, is adapted for operating on the sampled audio signal to identify that one or more embedded voice print data matches a predetermined voice print data (422). In one exemplary embodiment, the voice recognition algorithm is adapted to use any of the well-known speaker verification techniques including frequency estimation, hidden Markov models, Gaussian mixture models, pattern matching algorithms, neural networks, matrix representation, Vector Quantization and decision trees. If this identification data is detected, the wireless communication device is activated to accept further speech and/or voice commands (424). Alternatively, if this identification data is not detected (426), the identification algorithm is terminated, and the word spotting algorithm is reinitiated on the one or more wireless communication devices that are then operating in the first power mode. In another alternative embodiment, one or more additional identification algorithms may be performed.

Figure 6:
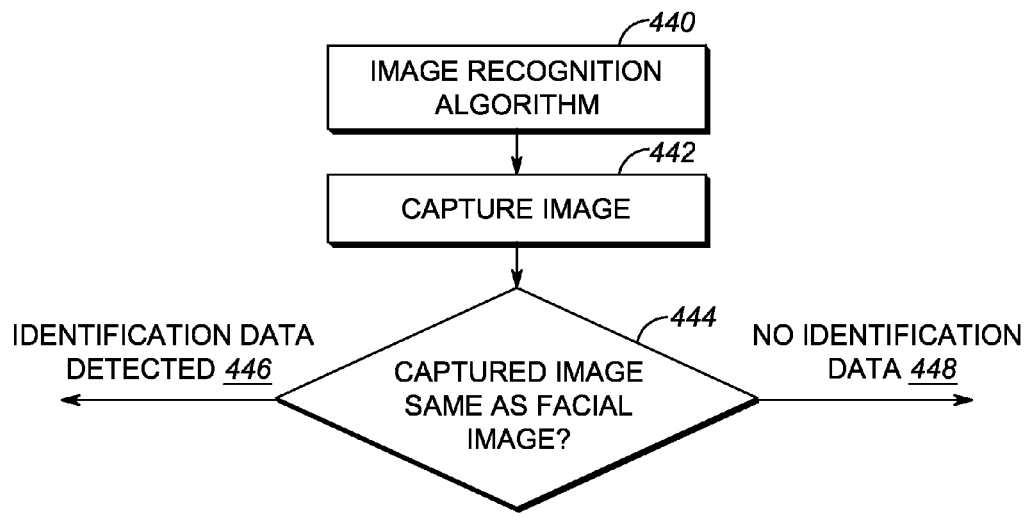
FIG. 6 is a logical flow diagram that illustrates and describes an embodiment of an identification algorithm.

In an alternative embodiment, an image recognition algorithm (440) may be performed on image data as depicted in FIG. 6. The image recognition algorithm is adapted for obtaining an image from an image capture device, such as a camera, and identifying one or more recognized images corresponding to the one or more reference images (444). The reference images may be of a user's face or any other image associated with the user. For example, if the user typically wears the communication device while in a vehicle, the reference image may be of the vehicle dashboard. In some situations, the user may place the communications device in a holder attached to the dashboard facing the user. In this case the reference image would be of the user sitting in the driver's seat (or passenger seat, as the case may be). Similarly, profile images may be used if the user typically places the communications device in the passenger seat facing the user in the driver's seat. If this identification data is detected, the wireless communication device is activated to accept further speech and/or voice commands (446). Alternatively, if this identification data is not detected (448), the plurality of identification algorithms is terminated, and the word spotting algorithm is reinitiated on the one or more wireless communication devices that are then operating in the first power mode.

Figure 7:
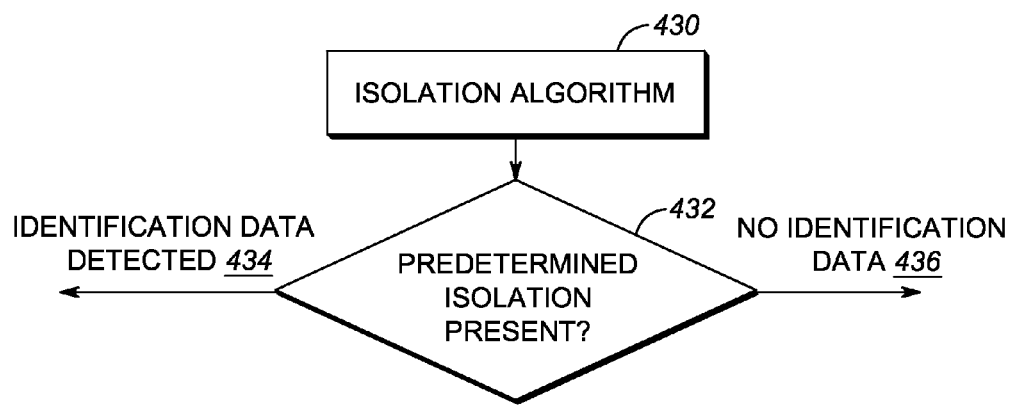
FIG. 7 is a logical flow diagram that illustrates and describes an embodiment of an identification algorithm.

In a further embodiment of FIG. 7, an isolation algorithm (430) may be performed on the sampled audio signal in combination with one or more of the other identification algorithms. The isolation algorithm is adapted to identify a predetermined degree of isolation between the keyword data sequence and a subsequent utterance. In an alternative embodiment, the isolation algorithm is adapted to identify a predetermined degree of isolation between the combination of the keyword data sequence and the embedded numeric or alphanumeric identity code and a subsequent utterance. In one embodiment, the predetermined isolation may be a minimum time duration of silence or non-speech, such as would occur when the speaker is awaiting confirmation from the mobile communication device that the keyword and/or keyword and digits have been recognized. The activity detector 190 may be used in some embodiments to detect a period of inactivity. In further embodiments, the activity detector may detect a period of activity followed by inactivity that may be used to trigger activation of the word spotting algorithm to analyze the buffered data for the presence of the identification data. In these various embodiments, if this identification data is detected, the wireless communication device is activated to accept further speech and/or voice commands (434). Alternatively, if this identification data is not detected (436), the identification algorithm is terminated, and the word spotting algorithm is reinitiated on the one or more wireless communication devices that are then operating in the first power mode. In another alternative embodiment, one or more additional identification algorithms may be performed.

Figure 8:
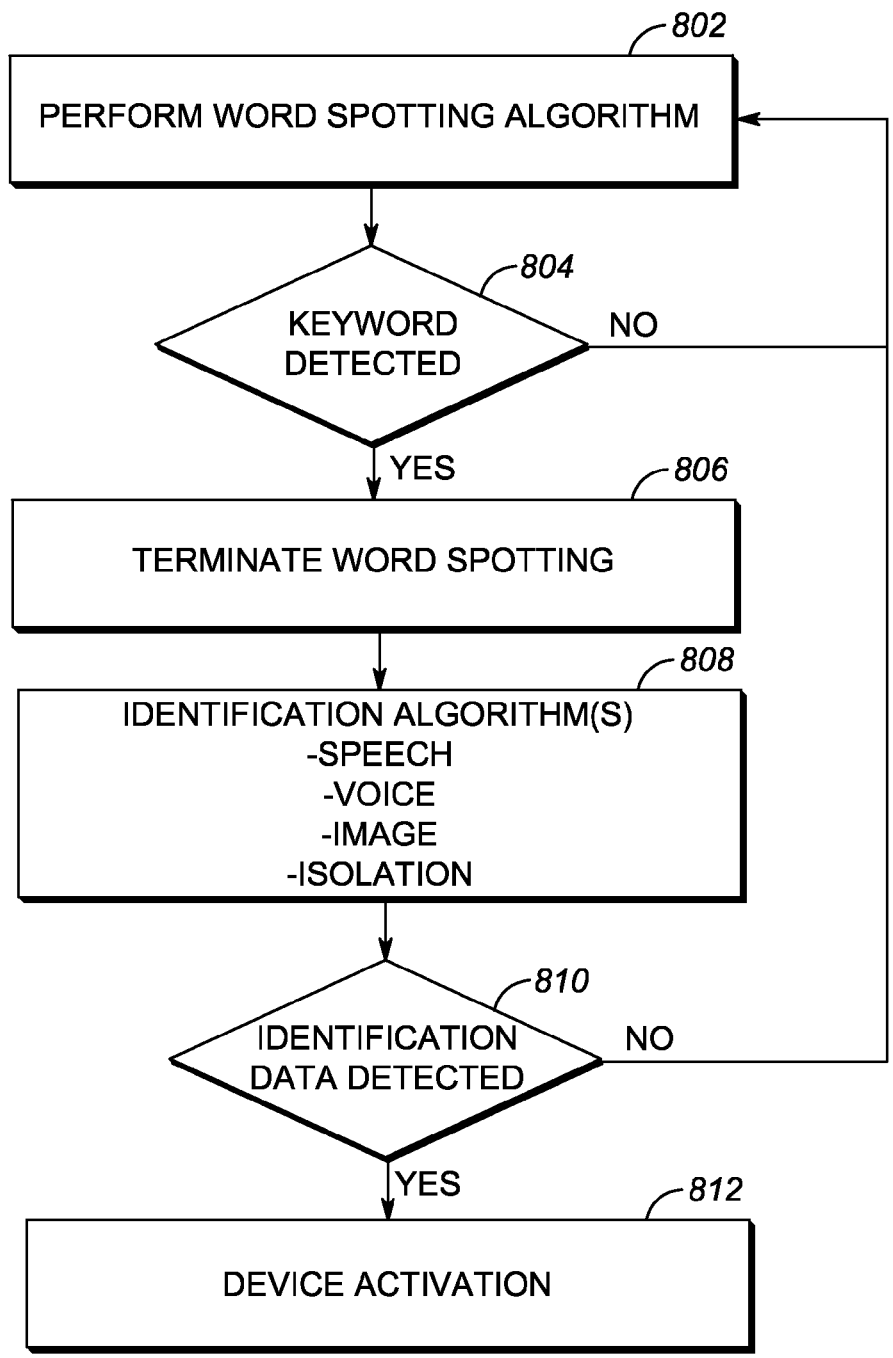
FIG. 8 is a flow chart of an embodiment of a method of activating the communications device.

In one embodiment 800 depicted in FIG. 8, a method may include initiating a word spotting algorithm (802) on a wireless communication device to detect a keyword data sequence embedded within a sampled audio signal. The device may be in a first power mode. In response to detecting the keyword data sequence (804), the method includes terminating the word spotting algorithm (806) and initiating one or more identification algorithms (808) on the wireless communication device to detect the presence of identification data. The device may be operating in a second power mode to perform the identification algorithm(s). If the identification data is detected (810), the mobile communication device is activated (812), and if the identification data is not detected, the one or more identification algorithms are terminated, and the word spotting algorithm (802) is reinitiated on the wireless communication device, which may also return to operating in the first power mode.

The identification algorithms (808) may include one or more of: (i) a speech recognition algorithm operating on the sampled audio signal to identify if an embedded numeric or alphanumeric identity code matches a predetermined numeric or an alphanumeric identity code; (ii) a voice recognition algorithm operating on the sampled audio signal to identify that one or more embedded voice print data matches a predetermined voice print data; (iii) an isolation algorithm operating on the sampled audio signal adapted to identify a predetermined degree of isolation between the keyword data sequence and subsequent utterances; and, (iv) an image recognition algorithm operating on one or more images obtained from an image capture device and identifying one or more recognized images corresponding to one or more reference images.

The speech recognition algorithm may include employing a digit recognizer to identify if the embedded numeric or alphanumeric identity code matches the predetermined numeric or alphanumeric identity code. Implementations of the voice recognition algorithm may be adapted for applying Mel-frequency cepstral coefficients to the sampled audio signal.

In some embodiments, the combination of (i) and (ii) are used to provide additional reliability. Other embodiments may use the combination of (i) and (iii) wherein the isolation is between the combination of the keyword sequence with the identity code and subsequent utterances. Other combinations are also possible.

In an alternative embodiment, methods and apparatuses may use a model that is a whole word model, with the whole word adapted to have variations based on state transitions from phonemes prior to the whole word and after the whole word.

Figure 9:
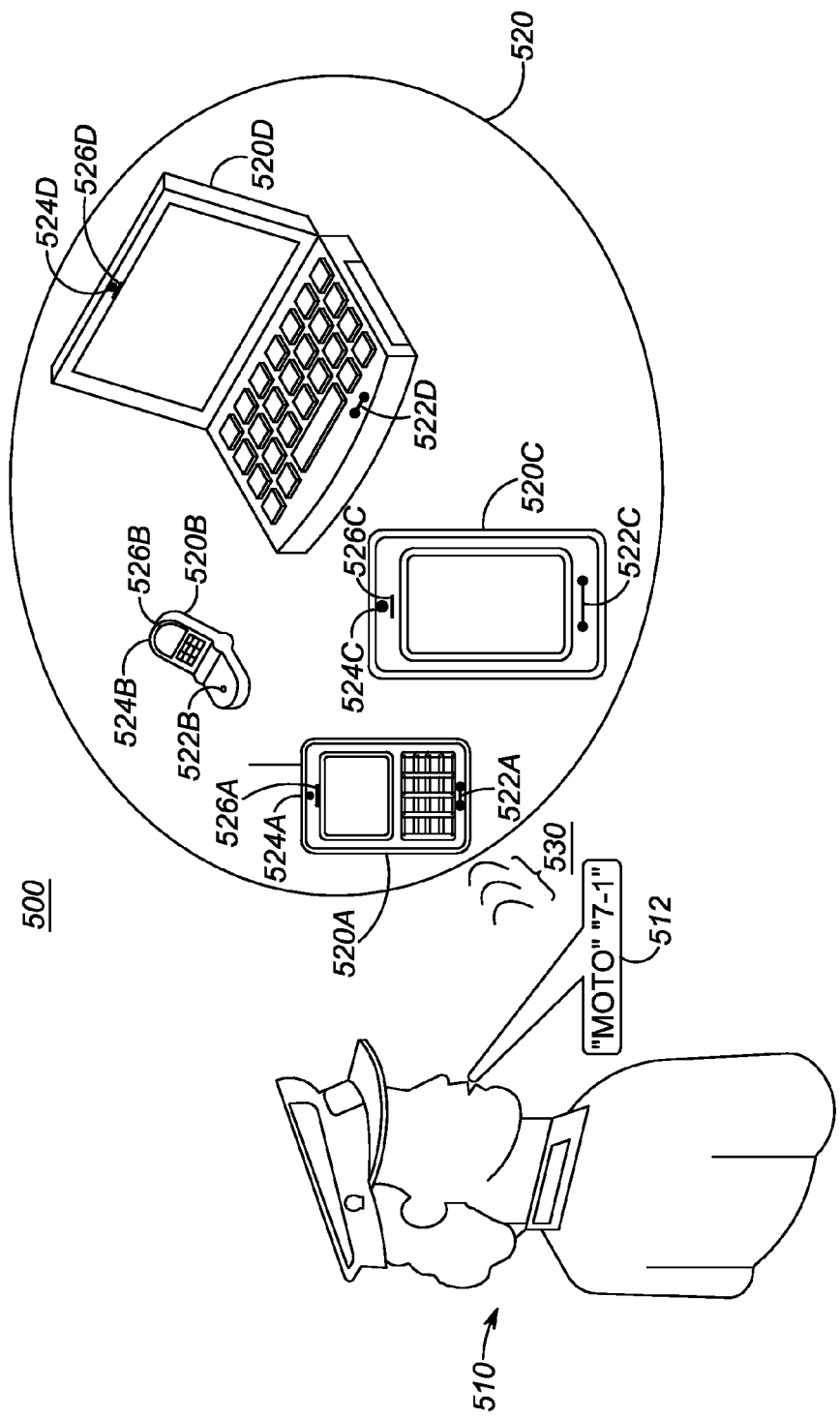
FIG. 9 is an illustration of one possible non-limiting implementation of some embodiments that activate a particular wireless communication device among a plurality of wireless communication devices to accept subsequent speech or voice commands.
Figure 10:
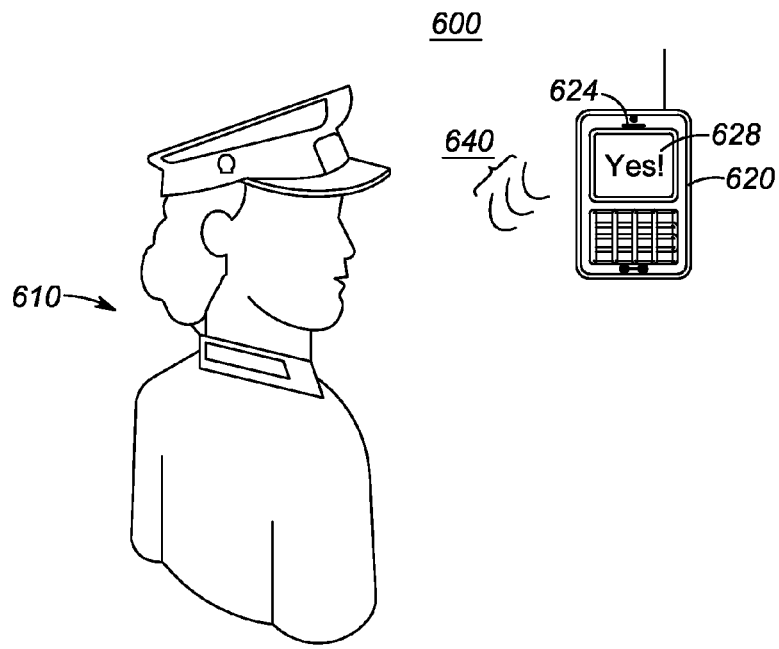
FIG. 10 is an illustration of the results of the plurality of identification algorithms initiated on a smart phone that activates that wireless communication device to accept further speech and/or voice commands in accordance with some embodiments of the present invention; and, FIG. 11 is an illustration of a visual recognition identification algorithm.
Figure 11:
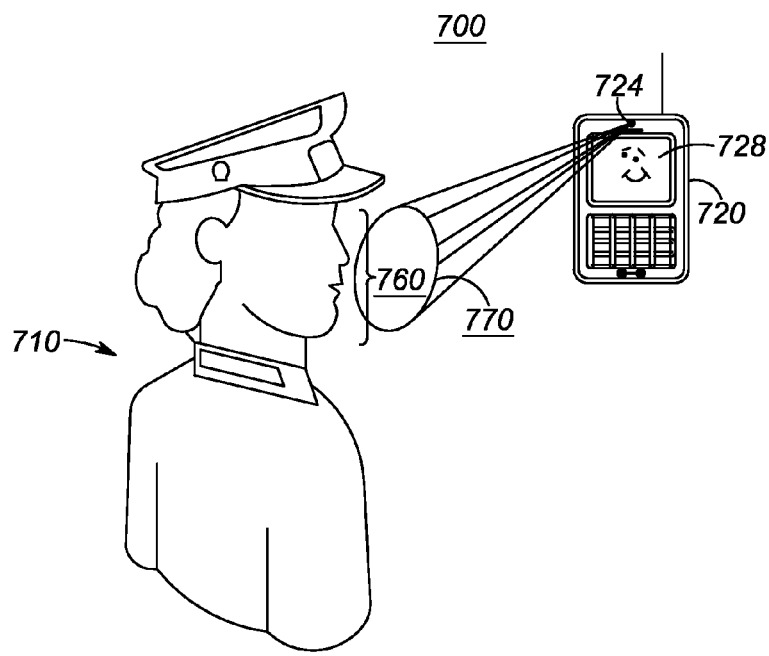

Referring now to FIGS. 9, 10 and 11, depicted are illustrations of possible non-limiting implementations of various embodiments of activating a particular wireless communication device, which may be situated among a plurality of wireless communication devices, to accept subsequent speech or voice commands (500). As shown in FIG. 9, a first responder, such as a police officer 510, utters the phrase "Moto" "7-1" (512) that is an acoustical signal 530 directed toward one or more wireless communication devices 520. In one embodiment, the one or more wireless communication devices 520 are adapted for communicating in a First Responders Network Authority (FirstNet) Nationwide Network (FNN).

The wireless communication devices 520 include a smart phone 520A equipped with a microphone 522A, a camera 524A, and a speaker 526A. Additionally, the wireless communication devices 520 may include a cellular phone 520B equipped with a microphone 522B, a camera 524B, and a speaker 526B. Moreover, the wireless communication devices 520 may alternatively further include a tablet 520C equipped with a microphone 522C, a camera 524C, and a speaker 526C. Also, wireless communication devices 520 may include a laptop computer 520D equipped with a microphone 522D, a camera 524D, and a speaker 526D. Additional features are omitted to simplify an example implementation such that smart phone 520A, cellular phone 520B, tablet 520C and laptop computer 520D include for example all features as shown in FIG. 1 and described in more detailed.

In FIG. 9, the police officer's 510 utterance of the phrase "Moto" "7-1" is received by the microphones of smart phone 520A, the cellular phone 520B, the tablet 520C and the laptop computer 520D. Each wireless communication device may be configured to run a keyword algorithm, also referred to as a word spotting algorithm, in a first power mode as described in more detail above. The wireless communication devices may detect the keyword "moto" embedded in audio signal 530 by sampling that signal with the analog to digital converter and processing it to identify a sequence of phonemes that match a keyword reference sequence. Accordingly, those devices will terminate the word spotting algorithm and initiate one or more identification algorithms operating in a second power mode to detect the presence of identification data. The identification data may be embedded in the sampled acoustic signal, captured image data, or both. As described above, a speech recognition algorithm is adapted for operating on the sampled audio signal to identify if an embedded numeric or alphanumeric identity code (i.e., "7-1") matches a predetermined numeric or an alphanumeric identity code stored in memory in one of the one or more wireless communication devices (520). Additional identification algorithms such as a voice recognition algorithm can be initiated to determine if the police officer's 510 voice matches voice prints stored in the memory in one of the one or more wireless communication devices (520). Also, an isolation algorithm can determine if the isolation between "Moto" "7-1" and any subsequent utterances match a predetermined value stored in memory in one of the one or more wireless communication devices (520).

As shown in FIG. 10, an illustration of the results of the plurality of identification algorithms initiated on smart phone 520A that activates that wireless communication device to accept further speech and/or voice commands (600). In one embodiment, a smart phone responds by causing a speaker 624 to create a second acoustic signal 640 (e.g., the word "Yes") directed toward the police officer 610. An alternative embodiment can include the communication device responding with an audible message that includes the keyword and digit sequence such as "Moto 7-1". A further embodiment can utilize display 628 to render the word "Yes!" in a flashing manner on that screen.

As shown in FIG. 11, an illustration of the visual recognition identification algorithm is shown in a smart phone in accordance with a further embodiment. As shown in FIG. 11, the image 760, which may a facial image, profile image or other image associated with police officer 710 is captured 770 by a camera 724 on the smart phone 720. The captured image 770 can in one embodiment optionally be rendered on a display 728.

Once the wireless communication device is activated to accept further speech and/or voice commands, a first responder can utter further commands, such as those activating local or network software. For example, a first responder can communicate with other first responders over the FNN or legacy networks such as land mobile radio systems, or he or she can change channels or obtain information such as weather conditions, or he or she can make a phone call by uttering a phone number or request data such as a map of the surrounding terrain to be rendered on the display.

In the foregoing specification, specific embodiments have been described. However, one of ordinary skill in the art appreciates that various modifications and changes can be made without departing from the scope of the invention as set forth in the claims below. Accordingly, the specification and figures are to be regarded in a illustrative rather than in a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   initiating a word spotting algorithm on a battery powered mobile wireless communication device in a first power mode to detect a keyword data sequence embedded within a sampled audio signal, the first power mode being adapted for low power consumption of the battery during the word spotting algorithm, and
   in response to detecting the keyword data sequence, terminating the word spotting algorithm and initiating a plurality of identification algorithms on the mobile wireless communication device operating in a second power mode to detect for a presence of identification data, the second power mode being adapted for higher power consumption of the battery during the plurality of identification algorithms, wherein the plurality identification algorithms consist of:
   (i) a speech recognition algorithm operating on the sampled audio signal to identify if an embedded numeric or alphanumeric identity code matches a predetermined numeric or an alphanumeric identity code;
   (ii) a voice recognition algorithm operating on the sampled audio signal to identify that one or more embedded voice print data matches a predetermined voice print data;
   (iii) an isolation algorithm operating on the sampled audio signal adapted to identify a predetermined degree of isolation between the keyword data sequence and subsequent utterances; and,
   (iv) an image recognition algorithm operating on one or more images obtained from an image capture device and identifying one or more recognized images corresponding to one or more reference images;
   wherein if the identification data is detected, the mobile wireless communication device is activated,
   wherein if the identification data is not detected, the plurality of identification algorithms are terminated, and the word spotting algorithm is reinitiated on the battery operated mobile wireless communication device operating in the first power mode.

2. The method of claim 1, wherein initiating the word spotting algorithm comprises:

chunking data received from an analog to digital convertor into data frames;
extracting features embedded in each frame of chunked data for phoneme recognition; and,
comparing recognized phonemes to a sequence of phonemes in a keyword data reference sequence.

3. The method of claim 2, wherein the model is a whole word model with the whole word adapted to have variations based on state transitions from phonemes prior to the whole word and after the whole word.

4. The method of claim 1, wherein the first power mode is a low power operational mode adapted for reduced power consumption of the battery by allowing the battery powered mobile wireless communication device to continually receive acoustic signals from an open microphone to spot keywords without significantly shortening, operational battery life of the battery powered mobile wireless communications device.

5. The method of claim 1, wherein the speech recognition algorithm further comprises:
employing a digit recognizer to identify if the embedded numeric or alphanumeric identity code matches the predetermined numeric or alphanumeric identity code.

6. The method of claim 1, wherein the voice recognition algorithm is adapted for applying Mel-frequency cepstral coefficients to the sampled audio signal.

7. The method of claim 1, wherein the first power mode being adapted for power consumption of the battery during the word spotting algorithm does not significantly impact operational battery life of the battery powered mobile wireless communications device.

8. The method of claim 1, wherein the initiating of the word spotting algorithm is initiated without use of a mechanical activation button or software emulated activation button.

9. An apparatus, comprising:
at least one processor; and at least one tangible memory storing computer instructions that when executed, cause the apparatus to:
initiate a word spotting algorithm on a battery powered mobile wireless communication device in a first power mode to detect a keyword data sequence embedded within a sampled audio signal, the first power mode being adapted for low power consumption of the battery during the word spotting algorithm, and in response to detecting the keyword data sequence, terminating the word spotting algorithm and initiating a plurality of identification algorithms on the battery powered mobile wireless communication device operating in a second power mode to detect the presence of identification data, the second power mode being adapted for higher power consumption of the battery during the plurality of identification algorithms, wherein the identification algorithms consist of:
(i) a speech recognition algorithm operating on the sampled audio signal to identify if an embedded numeric or alphanumeric identity code matches a predetermined numeric or alphanumeric identity code;
(ii) a voice recognition algorithm operating on the sampled audio signal to identify that one or more embedded voice print data matches a predetermined voice print data;
(iii) an isolation algorithm operating on the sampled audio signal adapted to identify a predetermined degree of isolation between the keyword data sequence and subsequent utterances; and,
(iv) an image recognition algorithm operating on one or more images obtained from an image capture device and identifying one or more recognized images corresponding to one or more reference images;
wherein if the identification data is detected, the mobile wireless communication device is activated,
wherein if the identification data is not detected, the identification algorithm is terminated, and the word spotting algorithm is reinitiated on the battery powered mobile wireless communication device operating in the first power mode.

10. The apparatus of claim 9, wherein the first power mode is a low power operational mode adapted for allowing the battery powered mobile wireless device to continually receive acoustic signals from a microphone.

11. The apparatus of claim 9, wherein initiating the word spotting algorithm comprises:
chunking data received from an analogue to digital convertor into data frames;
extracting features embedded in each frame of chunked data for phoneme recognition:
comparing recognized phonemes to a sequence of phonemes in a keyword data reference sequence.

12. The apparatus of claim 9, wherein the wireless communication device comprises a device selected from a group consisting of:
a cellular phone, a personal digital assistant, a wireless modem, and a mobile radio, and a laptop computer.

13. The apparatus of claim 9, wherein the battery powered mobile wireless communication device comprises a wireless land mobile radio operating within a land mobile radio system (LMRS) of a public safety network.

14. The apparatus of claim 9, wherein the first power mode being adapted for power consumption of the battery during the word spotting algorithm does not significantly impact operational battery life of the battery powered mobile wireless communications device.

15. The apparatus of claim 9, wherein word spotting algorithm is initiated without use of a mechanical activation button or software emulated activation button.

16. A non-transitory program storage device readable by a machine, tangibly embodying a program of instructions executable by the machine for causing operations, said operations comprising:
initiating a word spotting algorithm on a battery powered mobile wireless communication device in a first power mode to detect a keyword data sequence embedded within a sampled audio signal, the first power mode being adapted for low power consumption of the battery during the word spotting algorithm, and in response to detecting the keyword data sequence, terminating the word spotting algorithm and initiating a plurality of identification algorithms on the battery powered mobile wireless communication device operating in a second power mode to detect the presence of identification data, the second power mode being adapted for higher power consumption of the battery during the plurality of identification algorithms, wherein the plurality of identification algorithms comprise:
(i) a speech recognition algorithm operating on the sampled audio signal to identify if an embedded numeric or alphanumeric identity code matches a predetermined numeric or alphanumeric identity code;

(ii) a voice recognition algorithm operating on the sampled audio signal to identify that one or more embedded voice print data matches a predetermined voice print data;
(iii) an isolation algorithm operating on the sampled audio signal adapted to identify a predetermined degree of isolation between the keyword data sequence and subsequent utterances; and,
(iv) an image recognition algorithm operating on one or more images obtained from an image capture device and identifying one or more recognized images corresponding to one or more reference images;
wherein if the identification data is detected, the mobile wireless communication device is activated,
wherein if the identification data is not detected, the one or more identification algorithms are terminated, and the word spotting algorithm is reinitiated on the battery powered mobile wireless communication device operating in the first power mode.

17. The non-transitory program storage device of claim 16, wherein initiating the word spotting algorithm comprises:
chunking data received from an analogue to digital convertor into data frames;
extracting features embedded in each frame of chunked data for phoneme recognition;
comparing a sequence of recognized phonemes to a sequence of phonemes in a keyword data reference sequence.

18. The non-transitory program storage device of claim 16, wherein the second power mode is a higher power operational mode than the first power mode.

19. The non-transitory program storage device of claim 16, wherein the first power mode being adapted for power consumption of the battery during the word spotting algorithm does not significantly impact operational battery life of the battery powered mobile wireless communications device.

20. The non-transitory program storage device of claim 16, wherein the initiating of the word spotting algorithm is initiated without use of a mechanical activation button or software emulated activation button.

* * * * *